United States Patent
Dube et al.

(10) Patent No.: US 8,869,148 B2
(45) Date of Patent: Oct. 21, 2014

(54) CONCURRENCY IDENTIFICATION FOR PROCESSING OF MULTISTAGE WORKFLOWS

(71) Applicant: International Business Machines Corporation, Armonk, NY (US)

(72) Inventors: Parijat Dube, Hicksville, NY (US); Xiaoqiao Meng, Yorktown Heights, NY (US); Jian Tan, Wappingers Falls, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 13/623,968

(22) Filed: Sep. 21, 2012

(65) Prior Publication Data
US 2014/0089932 A1 Mar. 27, 2014

(51) Int. Cl.
*G06F 9/46* (2006.01)
(52) U.S. Cl.
USPC .......................................... 718/100; 718/101
(58) Field of Classification Search
None
See application file for complete search history.

(56) References Cited

U.S. PATENT DOCUMENTS

| | | | | |
|---|---|---|---|---|
| 5,437,032 | A * | 7/1995 | Wolf et al. | 718/103 |
| 5,890,134 | A * | 3/1999 | Fox | 705/7.24 |
| 6,549,930 | B1 | 4/2003 | Chrysos et al. | |
| 8,000,946 | B2 * | 8/2011 | Haas et al. | 703/6 |
| 8,230,426 | B2 | 7/2012 | Powers et al. | |
| 2003/0115239 | A1 * | 6/2003 | Togawa | 709/102 |
| 2004/0078547 | A1 * | 4/2004 | David et al. | 712/1 |
| 2007/0091088 | A1 | 4/2007 | Jiao et al. | |
| 2008/0034370 | A1 | 2/2008 | Huizenga | |
| 2009/0240546 | A1 * | 9/2009 | Sato | 705/8 |
| 2009/0259752 | A1 * | 10/2009 | McNutt et al. | 709/225 |
| 2010/0005468 | A1 | 1/2010 | Chang et al. | |
| 2010/0186043 | A1 * | 7/2010 | Yuki et al. | 725/50 |
| 2011/0161582 | A1 | 6/2011 | Volobuev | |
| 2011/0161959 | A1 * | 6/2011 | Sharon et al. | 718/101 |
| 2011/0258323 | A1 | 10/2011 | Jackson | |
| 2011/0289503 | A1 | 11/2011 | Toub et al. | |
| 2012/0011515 | A1 | 1/2012 | Jolfaei et al. | |
| 2013/0036425 | A1 * | 2/2013 | Zimmermann | 718/106 |
| 2013/0339972 | A1 * | 12/2013 | Zhang et al. | 718/104 |
| 2014/0089934 | A1 * | 3/2014 | Dube et al. | 718/104 |

FOREIGN PATENT DOCUMENTS

WO 2006042153 4/2006

OTHER PUBLICATIONS

International Search Report dated Mar. 21, 2014 in corresponding PCT/US13/58430.
Anandkumar, Animashree et al., "Tracking in a Spaghetti Bowl: Monitoring Transactions Using Footprints", Sigmetrics '08, Jun. 2-6, 2008, Annapolis, Maryland USA.
Roth, Matthias, et al., "Distributed identification of concurrent discrete event systems for fault detection purpose", European Control Conference 2009 (ECC 2009), Budapest: Hungary.

(Continued)

*Primary Examiner* — Emerson Puente
*Assistant Examiner* — Adam Lee
(74) *Attorney, Agent, or Firm* — F. Chau & Associates, LLC; Louis J. Percello

(57) ABSTRACT

A system and method may be utilized to identify concurrency levels of processing stages in a distributed system, identify common resources and bottlenecks in the distributed system using the identified concurrency levels, and allocate resources in the distributed system using the identified concurrency levels.

22 Claims, 6 Drawing Sheets

(56) References Cited

OTHER PUBLICATIONS

Estrada-Vargas, Ana P., "Off-line Identification of Concurrent Discrete Event Systems Exhibiting Cyclic Behaviour", IEEE 2009 International Conference on Systems, Man, and Cybernetics, San Antonio, Texas, US (2009).

Meda-Campana, M.E., et al., "Identificaiton of Concurrent Discrete Event Systems unsing Petri Nets", 2005 IMACS: Mathematical Computer Modelig and Simulation Conference; http.//metronu.ulb.ac.behmacs/papers/T4-R-00-0720.pdf.

An Oracle White Paper, Feb. 2010, "Rapid Bottleneck Identification—A Better Way do to Load Testing", http://www.oracle.com/technetwork/oem/grid-control/overview/wp-rapid-1.pdf.; Copyright Feb. 2010.

* cited by examiner

CONCURRENCY IDENTIFICATION FOR PROCESSING OF MULTISTAGE WORKFLOWS

BACKGROUND

1. Technical Field

The present disclosure relates to identifying concurrency levels of processing stages in a distributed system, and more particularly, to a system and method for identifying concurrency levels of processing stages in a distributed system, and using the identified concurrency levels to identify common resources and bottlenecks in the system, and allocate resources in the system.

2. Discussion of Related Art

A distributed system includes a plurality of job requests that traverse multiple processing stages prior to completion. A processing stage may correspond to, for example, a function or method call in the source code of a computer application. Each processing stage may be handled by one or more computers in the distributed system. The job requests may be processed in parallel at each processing stage based on the concurrency level of each respective stage. The concurrency level of a processing stage refers to the maximum number of job requests that the system can process at that stage at the same time. When the concurrency level at a processing stage is one, all jobs at that stage will be processed in sequential order. A stage having a limited concurrency level may act as a bottleneck that negatively impacts the performance of the system.

A limited concurrency level may be caused by a limited resource(s) in a system, or may be the result of the use of locks in a system. Locking, which is common in systems such as database systems, may be utilized to ensure the proper execution of job requests. Identifying operations in a system that result in limited concurrency levels, such as locking, may aid in improving the performance of a distributed system.

BRIEF SUMMARY

According to an exemplary embodiment of the present disclosure, a method of identifying a concurrency level of a first processing stage from a plurality of processing stages in a distributed system includes receiving measurement data indicating a starting time and an ending time of the first processing stage in each of a plurality of job requests, sorting, by a processor, the measurement data in an increasing time order, storing the sorted measurement data in a concurrency determination database, traversing the sorted measurement data beginning with a first portion of the measurement data having an earliest time, and ending with a last portion of the measurement data having a latest time, increasing the concurrency level, by the processor, upon determining that a current portion of the measurement data indicates a starting time of the first processing stage, decreasing the concurrency level, by the processor, upon determining that the current portion of the measurement data indicates an ending time of the first processing stage, and outputting a maximum concurrency level of the first processing stage equal to a largest value of the concurrency level.

In an exemplary embodiment, the method further includes comparing the maximum concurrency level of the first processing stage to a maximum concurrency level of a second processing stage, classifying a resource serving at least one of the first and second processing stages as a dedicated resource upon determining that the maximum concurrency level of the first processing stage is not equal to the maximum concurrency level of the second processing stage, and classifying the resource as a shared resource the upon determining that the maximum concurrency level of the first processing stage is equal to the maximum concurrency level of the second processing stage. The dedicated resource is capable of serving one of the first and second processing stages, and the shared resource is capable of serving both the first and second processing stages.

In an exemplary embodiment, the method further includes identifying, from a plurality of resources, dedicated resources capable of serving one processing stage from the plurality of processing stages, and common resources capable of serving more than one processing stage from the plurality of processing stages, allocating the dedicated resources to the plurality of processing stages as the processing stages arrive, and allocating the common resources to the plurality of processing stages as the processing stages arrive, upon determining that the dedicated resources are unavailable. The common resources are allocated in an order of common resources capable of serving a fewest number of processing stages to common resources capable of serving a largest number of processing stages.

In an exemplary embodiment, a system for identifying a concurrency level of a first processing stage from a plurality of processing stages in a distributed system includes an interface unit, a concurrency determination unit, and a concurrency determination database. The interface unit is configured to receive measurement data indicating a starting time and an ending time of the first processing stage in each of a plurality of job requests. The concurrency determination unit is configured to sort the measurement data in an increasing time order. The concurrency determination database is configured to store the sorted measurement data. The concurrency determination unit is further configured to traverse the sorted measurement data beginning with a first portion of the measurement data having an earliest time, and ending with a last portion of the measurement data having a latest time, increase the concurrency level upon determining that a current portion of the measurement data indicates a starting time of the first processing stage, and decrease the concurrency level upon determining that the current portion of the measurement data indicates an ending time of the first processing stage. The interface unit is further configured to output a maximum concurrency level of the first processing stage equal to a largest value of the concurrency level.

BRIEF DESCRIPTION OF THE SEVERAL VIEWS OF THE DRAWINGS

Exemplary embodiments of the present disclosure will be described below in more detail, with reference to the accompanying drawings.

DETAILED DESCRIPTION

Figure 1A:
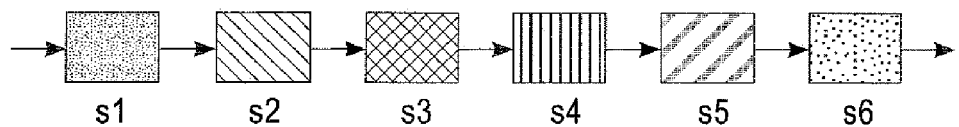
FIG. 1A shows a job request including six processing stages, s1 though s6, in a distributed system, according to an exemplary embodiment of the present disclosure.

A workflow (e.g., a business process workflow) corresponds to the processing of job requests in a system. The system may be, for example, a distributed processing system such as a business process management system, a transaction processing system, an information/data stream processing system, a management and provisioning system, a virtual machine (VM) provisioning system used for various cloud based services, or a multi-thread application system. The job request may be, for example, a web request, a user request, or a VM provisioning request. A job request may include a plurality of processing stages. In a complex system, several hundred processing stages may be included for each job request, and thousands of requests may be handled simultaneously.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Exemplary embodiments of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1A shows a job request including six processing stages, s1 though s6. The patterns representing the processing stages s1 through s6 are used to represent the same processing stages in FIGS. 2A to 2C. Multiple job requests may be simultaneously processed at each processing stage (e.g., each processing stage may correspond to a pool of threads for a certain task). The processing stages of a job request may be executed sequentially or concurrently. Although there is no actual limit to the number of concurrent requests executed at each stage, executing a high number of concurrent requests at a stage may result in locking behaviors, which can lead to a limited concurrency level at certain stages. According to exemplary embodiments of the present disclosure, these limiting stages may be detected by observing the job requests occurring in a system during normal operation, collecting measurement data, and analyzing the measurement data to identify the processing stage(s) having a limited concurrency level.

Certain resources available in a distributed system may be capable of serving different processing stages in the system. Resources may include, for example, processor cores, processor threads, memory, storage space or network bandwidth.

Various types of relevant measurement data spanning from the operating system level to the application level in a distributed system may be collected. In certain systems, this relevant measurement data is not directly available as a result of the different levels of abstraction in the application, middleware, and operating system levels. For example, the relevant resources used for handling high-level user requests and business workflows in a system may not be directly identifiable, since the operating system and middleware levels may not be informed of which processing stage is being served at a given time. According to exemplary embodiments, when timing data is not directly available from the system, the timing data provided at the application level may be measured. Once measured, the timing data may be used to obtain information regarding the operation of the system. For example, for each job request in a system, timestamps indicating the beginning and end of each processing stage in the job request may be collected. These timestamps may be analyzed to identify the concurrency level of the processing stages in a job request. Once the concurrency levels of all processing stages have been identified, the processing stage(s) acting as the bottleneck of the system may be identified.

Figure 1B:
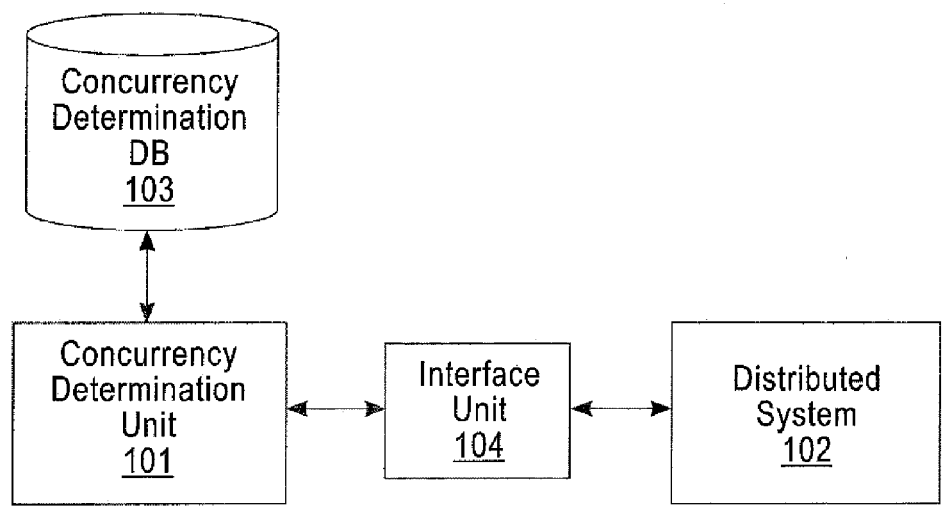
FIG. 1B shows a concurrency determination unit interfaced with a distributed system, according to an exemplary embodiment of the present disclosure.

FIG. 1B shows a concurrency determination unit 101 interfaced with a distributed system 102 via an interface unit 104. The concurrency determination unit 101 may include at least some of the components shown in the computer system 701 of FIG. 7. Once interfaced with the distributed system 102, the concurrency determination unit 101 may receive various types of information from the system 102 via the interface unit 104. For example, the concurrency determination unit 101 may receive the measurement data described above from the distributed system 102. The concurrency determination unit 101 may further receive resource data corresponding to the resources of the distributed system 102. The data received by the concurrency determination unit 101 may be stored in a concurrency determination database 103.

Figure 2A:
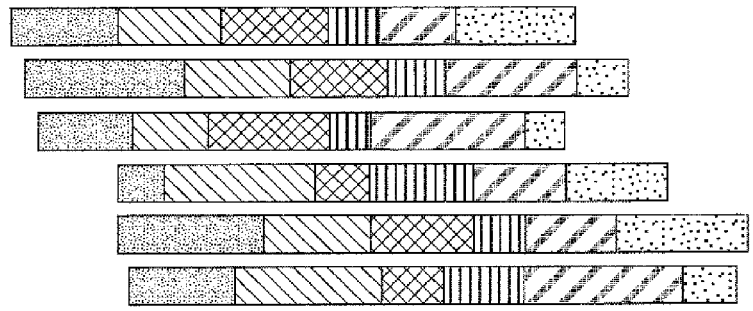
FIGS. 2A to 2C show a plurality of job requests including the processing stages of FIG. 1 ordered based on different criteria, according to an exemplary embodiment of the present disclosure.
Figure 2B:
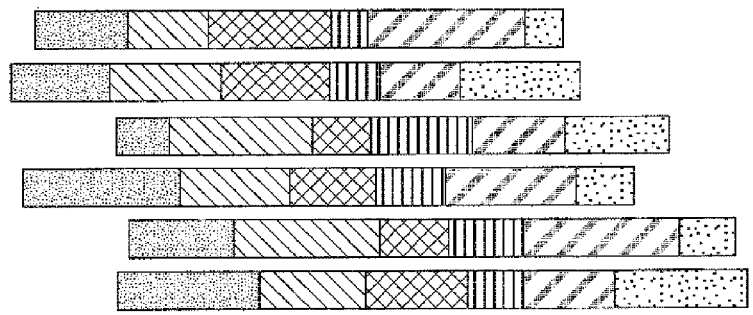
Figure 2C:
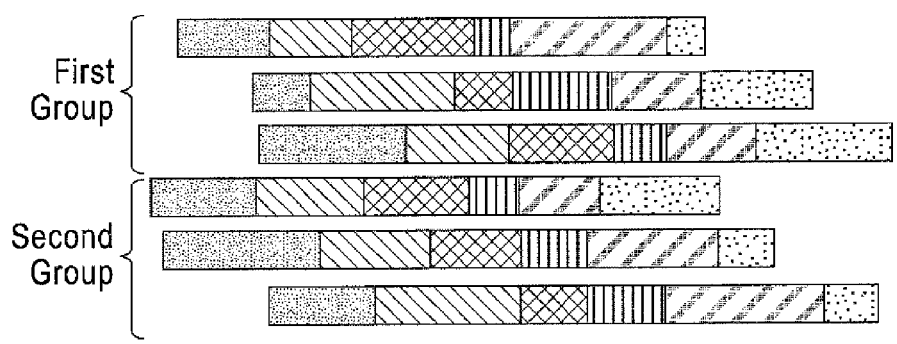

FIGS. 2A to 2C show a plurality of job requests including processing stages s1 to s6 from a distributed system ordered based on different criteria. There may be a high degree of randomness regarding the arrival time, processing time, and completion time of the processing stages in the job requests. For example, in certain instances, an earlier processing stage may or may not complete before a subsequent processing stage arrives. That is, a first processing stage may arrive before a second processing stage arrives, and the second processing stage may complete before the first processing stage completes. Determining patterns of the processing stages can allow for the identification of the respective maximum concurrency levels of the processing stages. Determining patterns may be accomplished by arranging the job requests in a number of different groupings based on different criteria.

For example, in FIG. 2A, six job requests are ordered based on the arrival time of the first processing stage s1. That is, the job requests are ordered based on the order that each job request begins processing the first processing stage s1. In FIG. 2B, the job requests are ordered based on the arrival time of the fourth processing stage s4. The job requests may continue to be arranged in additional groupings based on different criteria such as, for example, the arrival time of the second processing stage s2, third processing stage s3, fifth processing stage s5, or sixth processing stage s6. Analyzing a large number of groupings increases the probability of identifying patterns that may be used to determine the maximum concurrency levels of the processing stages.

Analyzing the grouping shown in FIG. 2B indicates that a pattern exists based on the arrival time of the fourth processing stage s4. In light of this pattern, the job requests may be arranged in different groups. For example, in FIG. 2C, the job requests are arranged in two groups based on the fourth processing stage s4. As shown in FIG. 2C, the fourth processing stage s4 is not processed concurrently within each respective group. That is, in the first group, each instance of the fourth processing stage s4 completes before another instance of the fourth processing stage s4 arrives. Similarly, in the second group, each instance of the fourth processing stage s4 completes before another instance of the fourth processing stage s4 arrives. Thus, in the six job requests shown in FIGS. 2A-2C, no more than two instances of the fourth processing stage s4 are running concurrently, and the maximum concurrency level for the fourth processing stage s4 is therefore two. As a result, only a minimum of two resources capable of serving the fourth processing stage s4 are required for the six job requests. For example, a first resource can serve the fourth processing stage s4 in the first group, and a second resource can serve the fourth processing stage s4 in the second group.

Figure 3:
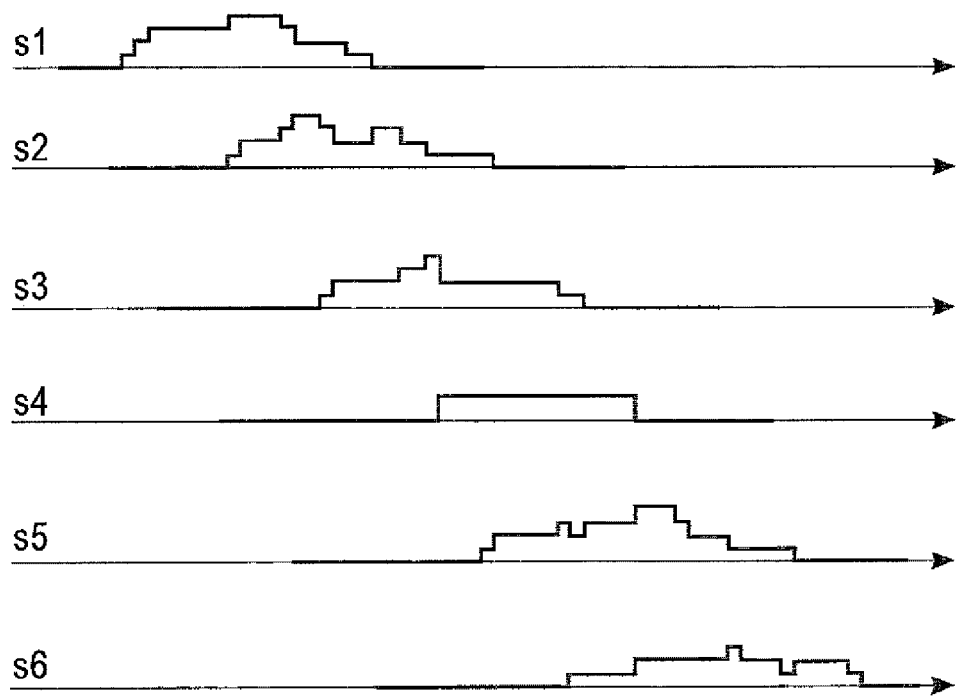
FIG. 3 shows graphs representing the concurrency level as a function of time for each of the processing stages s1 to s6 shown in FIGS. 2A to 2C, according to an exemplary embodiment of the present disclosure.

Generating various groupings based on various patterns, as described above with reference to FIGS. 2A-2C, allows for the determination of the maximum concurrency level for each processing stage in a plurality of job requests, as shown in FIG. 3. FIG. 3 shows graphs representing the concurrency level as a function of time for each of the processing stages s1 to s6 shown in FIGS. 2A to 2C. The height of the line in the graphs of FIG. 3 corresponds to the number of concurrent instances of the respective processing stages at a given time. For example, each graph begins at zero, corresponding to a time when no job requests are active. Once a processing stage arrives in a job request, the line of the corresponding graph increases by one. Similarly, once a processing stage finishes in a job request, the line of the corresponding graph decreases by one. As a result, the graphs indicate how many resources are required for each processing stage at a given time. The maximum value (e.g., height) of the line of each graph represents the maximum concurrency level for the corresponding processing stage. For example, as shown in FIG. 3, the maximum concurrency level for the first through third processing stages s1 through s3 is four, respectively, the maximum concurrency level for the fourth processing stage s4 is two, the maximum concurrency level for the fifth processing stage s5 is four, and the maximum concurrency level for the sixth processing stage s6 is three. Once the maximum concurrency level for each processing stage has been determined, the processing stage acting as the bottleneck in the system may be identified.

Figure 4:
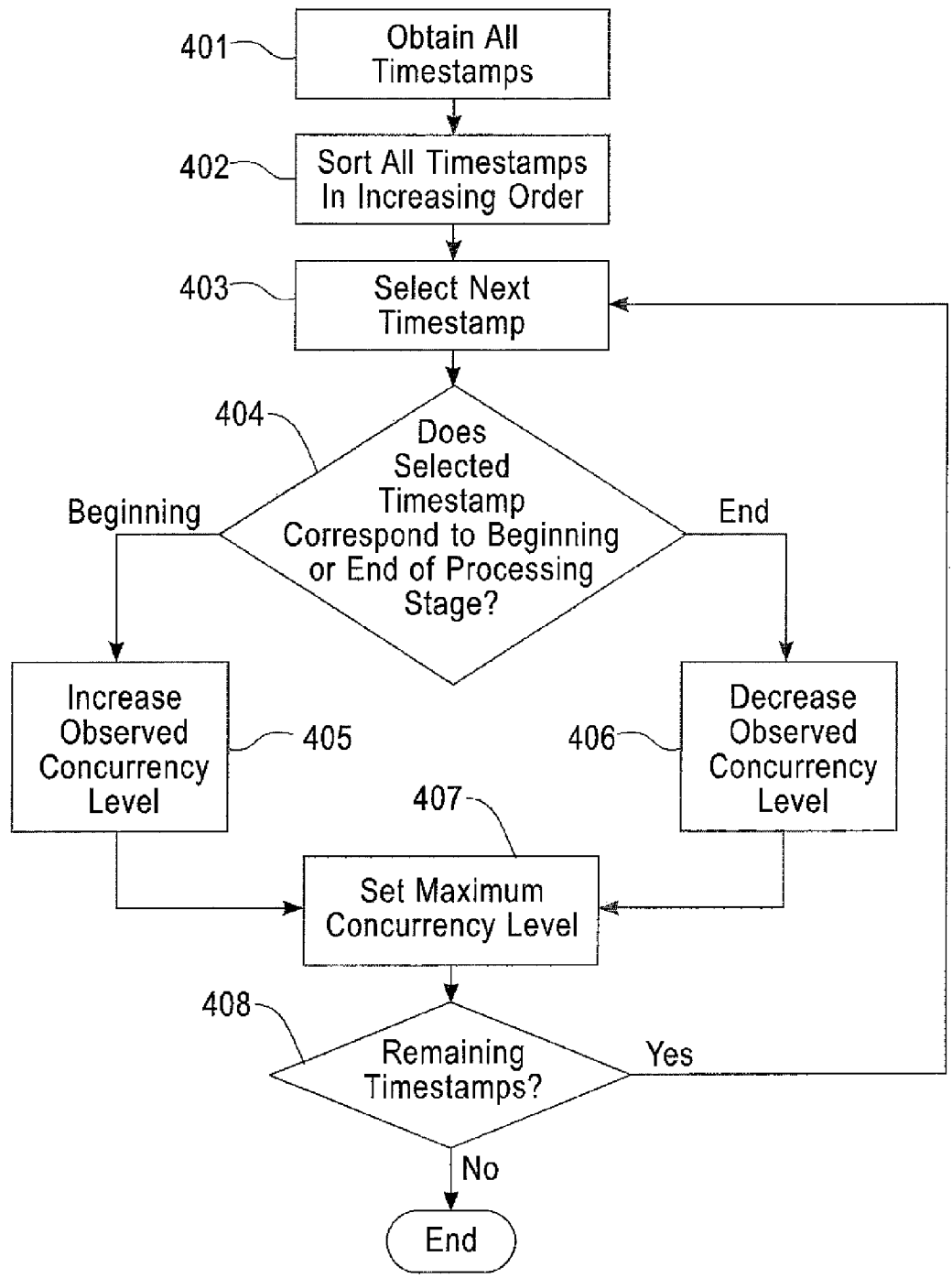
FIG. 4 is a flowchart showing a method for determining the respective maximum concurrency levels of the processing stages shown in FIG. 3, according to an exemplary embodiment.

FIG. 4 is a flowchart showing a method for determining the respective maximum concurrency levels of the processing stages shown in FIG. 3, according to an exemplary embodiment.

As described above, in exemplary embodiments, the measurement data received from a distributed system may include timestamps indicating the beginning and end of each processing stage in a job request. Identification of all timestamps T_s allows the plurality of job requests to be ordered, as shown in FIGS. 2A to 2C. The timestamps T_s may be used to determine the maximum concurrency level max_Concurr_s for each stage s. That is, the maximum concurrency level for each stage s may be determined by selecting, ordering, and analyzing all timestamps for a plurality of jobs in a system. For I job requests having S stages submitted in a system, T(i,s,begin) represents a timestamp corresponding to when the system starts processing stage s for the i'th request, and T(i,s,end) represents a timestamp corresponding to when the system finishes processing stage s for the i'th request, wherein i=1, . . . , I, and s=1, . . . , S. In an exemplary embodiment, the timestamps may be obtained from a globally synchronized time source. If the timestamps are instead obtained from different unsynchronized clocks, clock synchronization mechanisms may be utilized.

At block 401, all of the timestamps T_s are obtained for a given processing stage s, where:

$$T\_s = T(i,s,\text{begin}) \text{ and } T(i,s,\text{end}) | i=1 \ldots, I)$$

Once selected, the timestamps T_s are sorted in increasing order at block 402. The entire timeline is then scanned from the beginning of all trace data (Tmin) to the end of all trace data (Tmax), where:

$$T\text{min} = \min\{T(i,s,\text{begin}) \text{ and } T(i,s,\text{end}) | i=1=1,\ldots,I; s=1,\ldots,S\}$$

$$T\text{max} = \max\{T(i,s,\text{begin}) \text{ and } T(i,s,\text{end}) | i=1,\ldots,I; s=1,\ldots,S\}$$

Initially, when the scanning begins:

$$\text{Concurrency}\_s(T\text{min}) = 0$$

$$\text{prev\_timestamp} = T\text{min} - 1$$

$$\text{max\_Concurrency}\_s = 0$$

At block 403, the next timestamp next_timestamp from the sorted list of timestamps T_s is selected. At block 404, it is determined whether the next timestamp next_timestamp corresponds to the beginning of the processing stage s or the end of the processing stage s. If the next_timestamp next_timestamp corresponds to the beginning of the processing stage s, the method proceeds to block 405, and:

$$\text{concurrency}\_s(\text{next\_timestamp}) = \text{concurrency}\_s(\text{prev\_timestamp}) + 1$$

Referring to FIG. 3, block 405 corresponds to increasing the observed concurrency level of the processing stage s by one (e.g., the height of the line in the graph is increased by one). At block 404, if the next timestamp next_timestamp corresponds to the end of the processing stage s, the method proceeds to block 406, and:

$$\text{concurrency}\_s(\text{next\_timestamp}) = \text{concurrency}\_s(\text{prev\_timestamp}) - 1$$

Referring To FIG. 3, block 406 corresponds to decreasing the observed concurrency level of the processing stage s by one (e.g., the height of the line in the graph is decreased by one). At a given time, the number of concurrent instances of the processing stage s is:

$$\text{max\_Concurrency}\_s = \max\{\text{max\_Concurrency}\_s, \text{concurrency}\_s(\text{next\_timestamp})\}$$

The previous timestamp prev_timestamp is then set to the next timestamp next_timestamp:

$$\text{prev\_timestamp} = \text{next\_timestamp}$$

At block 407, the maximum concurrency level is set. Initially, the maximum concurrency level is set to zero. At block 407, if the observed concurrency level was previously increased by one at block 405, the maximum concurrency level is increased by one. Alternatively, if the observed concurrency level was previously decreased by one at block 406, the maximum concurrency level is not changed. Blocks 403 to 407 are repeated until all timestamps in the sorted list of timestamps T_s have been scanned (see block 408). Referring to FIG. 1B, the measurement data may be received by the concurrency determination unit 101 from the distributed system 102 via the interface unit 104, and may be stored, sorted, and analyzed utilizing the concurrency determination unit 101 and the concurrency determination database 103.

Once the scanning process has been completed, the stage bottleneck may be identified. For example, the processing stage having the minimum achieved maximum concurrency max_Concurrency_s may be identified as the stage bottleneck. The stage bottleneck is the most constrained stage in terms of achieved concurrency level in the system. When the system is under a high load, this stage may negatively affect the system's performance. Improving execution at this stage may result in an improvement in the overall system performance.

Using the scanning process described with reference to FIG. 4, the time-weighted average concurrency level for each stage ave_Concurrency_s may also be calculated. A small gap between ave_Concurrency_s and max_Concurrency_s for each stage s indicates that the current stage has been operating at its capacity for a significant amount of time, and thus, may be acting as a bottleneck stage.

In addition to evaluating the concurrency level for each processing stage s in isolation, as described above, exemplary embodiments of the present disclosure may evaluate processing stages that share a common resource pool. For example, in an application server environment, a thread pool with a preset number of threads can be set up to serve requests at different stages of processing. In this environment, viewing each processing stage in isolation may not result in an accurate identification of the bottleneck of the system. In a system including shared resources, certain resources may be capable of serving only a single processing stage, and other resources may be capable of serving multiple processing stages. For example, referring to FIGS. 1-3, a first resource may be capable of serving the first processing stage s1, a second resource may be capable of serving the second processing stage s2, and a third resource may be capable of serving both the first and second processing stages s1 and s2.

To accurately identify the bottleneck of a distributed system sharing common resources, the system is observed for an amount of time allowing all possible combinations of processing stages and resources (e.g., threads, processes) to be observed. The observed maximum concurrency level max_Concurr_s is the actual limit of the system. In a given system, some processing stages may not share the same resource(s), some processing stages may share the same resource(s), and some processing stages may have a dedicated resource(s) and also share a common resource(s).

Identifying which resources are common resources and which resources are dedicated resources allows the resources to be assigned to the processing stages in a manner that increases performance and decreases system bottlenecks. This identification may be made by observing a distributed system at various times and identifying which resources may serve which processing stages. That is, if a system is observed for a sufficient period of time, the structure of the system, including which resources are capable of serving which processing stages, may be determined. For example, observing a system for a sufficient period of time allows for the determination of which resources are dedicated resources, and which resources are common resources shared among multiple processing stages. Referring to FIG. 1B, the concurrency determination unit 101 may be utilized to observe the distributed system 102, and may receive input representing the observed resource behavior via the interface unit 104.

Figure 5A:
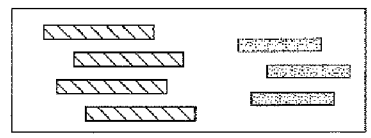
FIGS. 5A to 5C show different distributed systems including two resources and two processing stages s1 and s2, according to an exemplary embodiment of the present disclosure.
Figure 5B:
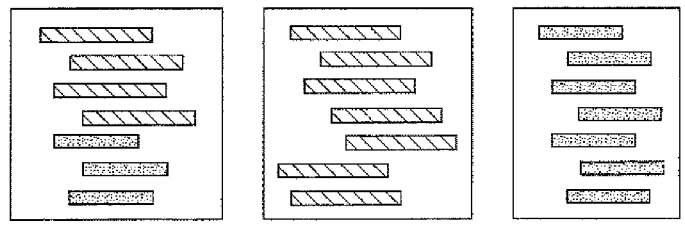
Figure 5C:
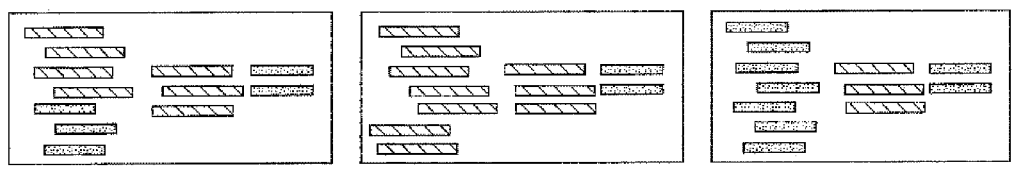

FIGS. 5A to 5C show different distributed systems including two resources and two processing stages s1 and s2. In FIGS. 5A to 5C, a first resource is represented by diagonal lines and a second resource is represented by a solid shade.

Referring to FIG. 5A, processing stages s1 and s2 do not share the same resource pool. When processing stages s1 and s2 do not share the same resource pool, the first resource is capable of serving only processing stage s1, and the second resource is capable of serving only processing stage s2. Thus, when observed over a period of time, the system in FIG. 5A will always show the first resource serving the first processing stages s1, and the second resource serving the second processing stage s2. In this case:

$$\text{max\_Concurr\_}\{s1,s2\} = \text{max\_Concurr\_}\{s1\} + \text{max\_Concurr\_}\{s2\}$$

Thus, in FIG. 5A, max_Concurr_{s1, s2}=7, max_Concurr_{s1}=4, and max_Concurr_{s2}=3.

In FIG. 5B, processing stages s1 and s2 share the same resource pool. When the processing stages share the same resource pool, the resources are capable of serving both the first processing stage s1 and the second processing stage s2. Thus, when observed over a period of time, the system in FIG. 5B will show different combinations of the two resources serving both the first processing stage s1 and the second processing stage s2. For example, in the first observation of FIG. 5B, the first resource and the second resource split between serving the first and second processing stages s1 and s2. In the second observation of FIG. 5B, all of the processing stages are served only by the first resource. In the third observation of FIG. 5B, all of the processing stages are served only by the second resource. When processing stages s1 and s2 share the same resource pool:

$$\text{max\_Concurr\_}\{s1,s2\} = \text{max\_Concurr\_}\{s1\} = \text{max\_Concurr\_}\{s2\}$$

Thus, in FIG. 5B, max_Concurr_{s1, s2}=7, max_Concurr_{s1}=7, and max_Concurr_{s2}=7. Observing the behavior of FIGS. 5A and 5B allows for the identification of which resources are shared resources.

In FIG. 5C, processing stages s1 and s2 each have a dedicated resource pool and also share a common resource pool. That is, in FIG. 5C, some resources are capable of only serving the first processing stage s1, some resources are capable of only serving the second processing stage s2, and some resources are capable of serving both the first and second processing stages s1 and s2. In the first observation of FIG. 5C, the common resources are mixed between the first processing stage s1 and the second processing stage s2. In the second observation of FIG. 5C, all of the resources capable of serving the first processing stage s1 are assigned to the first processing stage s1. In the third observation of FIG. 5C, all of the resources capable of serving the second processing stage s2 are assigned to the second processing stage s2. Observing these different scenarios allows for the identification of which resources are dedicated resources and which resources are shared resources. When processing stages s1 and s2 each have a dedicated resource pool and also share a third, common resource pool:

$$\max\{\text{max\_Concurr\_}\{s1\},\text{max\_Concurr\_}\{s2\}\} < \text{max\_Concurr\_}\{s1,s2\} < \text{max\_Concurr\_}\{s1\} + \text{max\_Concurr\_}\{s2\}$$

Figure 5D:
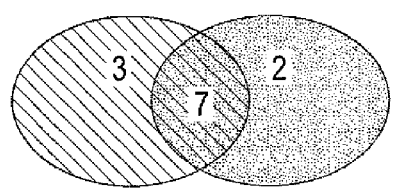
FIG. 5D is an illustration showing the relationship between the processing stages shown in FIG. 5C.

Thus, in FIG. 5C, max{max_Concurr_{s1}, max_Concurr_{s2}}={10, 9}, max_Concurr_{s1, s2}={12}, and max_Concurr_{s1}+max_Concurr_s2}=10+9. This relationship between the resources and the processing stages, which was identified by observing the system at various points of time, may be represented as shown in FIG. 5D. FIG. 5D indicates that three of the first resources are capable of only serving the first processing stage s1, two of the second resources are capable of only serving the second processing stage s2, and seven of the first and second resources are capable of serving both the first and second processing stages s1 and s2.

Figure 6:
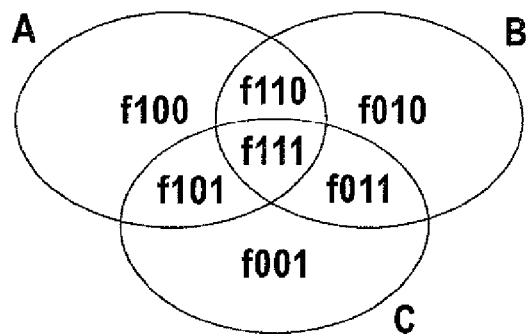
FIG. 6 shows an example of a system having three processing stages and a plurality of resources, according to an exemplary embodiment of the present disclosure.

FIG. 6 is a visual representation of a system having three processing stages A, B and C, and a plurality of resources f100, f010, f001, f110, f101, f011 and f111. Referring to FIG. 6, f(A) indicates the resources capable of performing processing stage A, f(B) indicates the resources capable of performing processing stage B, and f(C) indicates the resources capable of performing processing stage C. Thus, referring to FIG. 6:

$$f(A) = \text{max\_Concurr\_}A = f100 + f101 + f110 + f111$$

$$f(B) = \text{max\_Concurr\_}B = f010 + f011 + f110 + f111$$

$$f(C) = \text{max\_Concurr\_}C = f001 + f011 + f101 + f111$$

Further, in FIG. 6, multiple processing stages may be considered together. For example, all of the resources capable of performing processing stages A and B, processing stages B and C, processing stages C and A, and processing stages A, B and C may be considered. Thus, referring to FIG. 6:

$$f(A \cup B) =$$
$$\text{max\_Concurr\_}(A, B) = f100 + f010 + f110 + f101 + f011 + f111$$
$$f(A \cup B) = \text{max\_Concurr\_}(B, C) =$$
$$f010 + f001 + f110 + f101 + f011 + f111$$
$$f(C \cup A) = \text{max\_Concurr\_}(C, A) =$$
$$f001 + f100 + f110 + f101 + f011 + f111$$
$$f(A \cup B \cup C) = \text{max\_Concurr\_}(A, B, C)$$
$$= f001 + f010 + f100 + f110 + f101 + f011 + f111$$

The functions listed above indicate which resources are capable of serving which processing stages, however, the functions do not indicate which resources are dedicated resources, and which resources are common resources. That is, the functions do not indicate which resources are capable of only serving one of processing stages A, B, and C, and which resources are capable of serving more than one of processing stages A, B, and C. Identifying which resources are dedicated resources and which resources are common resources may be accomplished by obtaining the solutions for the above functions:

$$f100=f(A\cup B\cup C)-f(B\cup C)$$

$$f010=f(A\cup B\cup C)-f(C\cup A)$$

$$f001=f(A\cup B\cup C)-(f\cup B)$$

$$f110=f(A\cup B)-f100-f010-f(C)+f001$$

$$f011=f(B\cup C)-f010-f001-f(A)+f100$$

$$f101=f(C\cup A)-f001-f100-f(B)+f010$$

$$f111=f(A)+f(B)-f(A\cup B)-f110$$

Although the exemplary embodiment described above includes three processing stages and seven resources, exemplary embodiments of the present disclosure are not limited thereto. To determine the values of the resources, the single dedicated resources $f(e\_i)$ are first computed, where $e\_i$ is the $i^{th}$ unit vector, the $i^{th}$ dimension is 1, and other dimensions are 0. The following equation corresponds to f(A), f(B), and f(C), as shown above:

$$f(e\_i)=f(\Omega-f(\Omega-\{i\}))$$

The original values of f(A) for each set A may then be reduced such that $f1(A)=f(A)-\sum\_{i\in A} f(e\_i)$, where f1(A) correspond to all of the resources dedicated to serve A that are shared by at least 2 stages. Performing this update removes the single dedicated resource from the function f(x). The dedicated resource $f(e\_{ij})$ that serves only stage i and j is then computed, where:

$$f(e\_ij)=f1(\{i,j\})-f1(\Omega-\{i,j\})$$

The values of f1(A) are then reduced to obtain:

$$f2(A)=f1(A)-\sum\_{i,j\in A}f1(e\_ij)$$

This process is repeated to compute the dedicated resource that only serves three stages, and the entire procedure is repeated until the values of all resources are computed.

When observing a distributed system, it is possible that less than every combination of the system state in the system has been observed. As a result, the observed concurrency values may be less than the actual maximum concurrency values in the system. Further, systems that have more dedicated pools of resources than shared pools of resources may result in a high number of disjoint sets (e.g., many intersections may have 0 values). A disjoint set corresponds to resources that are only capable of serving one processing stage, or a relatively low number of processing stages. In response, the randomness of the system may be determined using, for example, Poisson distribution, indicating the likelihood that every possible combination of resources has been observed.

When the number of processing stages in a distributed system is large, determining all of the shared resources may be a complex undertaking. However, systems having a large number of processing stages often have many dedicated resource pools that handle most of the processing stages. In an exemplary embodiment, consecutive processing stages may be identified and merged into a combined stage to reduce the complexity when observing the system. For example, neighboring processing stages s1 and s2 may be combined when all resources capable of serving processing stage s1 may also serve processing stage s2, and vice versa. For example, when:

$$\text{max\_Concurr\_}\{s1,s2\}=\text{max\_Concurr\_}\{s1\}=\text{max\_Concurr}\{s2\},$$

processing stages s1 and s2 may be merged together. When a system has a large number of processing stages, there may be a number of different ways to share the resources of the system. Different resource sharing schemes may lead to different capacities of the system. In an exemplary embodiment, the possible different resource sharing patterns may be identified and evaluated, and the resource sharing pattern resulting in the maximum capacity of the system may then be selected. Further, identifying each possible resource sharing pattern in a system allows for the identification of the bottleneck in the system when the system is operating at maximum capacity.

In an exemplary embodiment, a steady stream of job requests arriving at the system are observed to determine the maximum sustained throughput of the system. The throughput of the system, which is the same for all stages s, is equal to the average concurrency divided by the average residence time. For example, for each processing stage s:

$$\text{average\_throughput\_s} = \lambda\_s = \frac{\text{average\_Concurr\_s}}{\text{average\_residence\_time\_s}}$$

Identifying the throughput allows for the identification of system bottleneck(s), and in turn allows for the determination of which resources should be assigned to which processing stages, and which types of resources should be added to the system.

Once it has been determined that a distributed system includes at least some common resources, a determination must be made as to how the common resources are to be shared among the processing stages the resources are capable of serving. Different sharing schemes may lead to different throughput in the system. Thus, it is desirable to identify and select a sharing scheme capable of increasing, or maximizing system throughput.

Referring to FIG. 6, the resources in the intersections are common resources capable of serving the corresponding processing stages. For example, resource f111 is capable of serving processing stages A, B and C. The common resources may be defined based on the processing stages they are capable of serving. For example, resource f111 may be defined as f111_A, f111_B, and f111_C. Thus, referring to FIG. 6:

$$f111 \geq f111\_A+f111\_B+f111\_C$$

$$f110 \geq f110\_A+f110\_B$$

$$f011 \geq f011\_B+f011\_C$$

$$f101 \geq f101\_A+f101\_C$$

The maximum throughput of a processing stage may be determined by assigning all resources capable of serving the processing stage to the processing stage, and observing the performance of the processing stage relative to a time constraint representing the amount of time taken to complete the processing stage (e.g., T1 for processing stage A, T2 for processing stage B, and T3 for processing stage C). This procedure may be performed for each processing stage in the system. For example, the throughput of processing stages A, B and C are represented by the following inequalities:

$$\text{Throughput\_A} \le \left( \frac{f100 + f110\_A + f101\_A + f111\_A}{T1} \right)$$

$$\text{Throughput\_B} \le \left( \frac{f010 + f110\_B + f011\_B + f111\_B}{T2} \right)$$

$$\text{Throughput\_C} \le \left( \frac{f001 + f101\_C + f011\_C + f111\_C}{T3} \right)$$

The overall throughput of the system is equal to the lowest throughput value of processing stages A, B, and C. That is, the overall throughput of the system is limited by the processing stage having the lowest throughput. For example:

Overall_Throughput=min(Throughput_$A$,Throughput_$B$,Throughput_$C$)

The maximum overall throughput of the system is subject to:

Overall_Throughput<=Throughput_$A$

Overall_Throughput<=Throughput_$B$

Overall_Throughput<=Throughput_$C$

Thus, using the above optimization formula, the overall throughput of the system can be maximized. Solving the above inequalities indicates which stage(s) is the bottleneck stage(s), and thus, allows for a determination to be made regarding the manner in which the common resources are to be shared. Once a processing stage is identified as the bottleneck stage, all shared resources between the bottleneck stage and other stages may be allocated to the bottleneck stage. For example, if processing stage B is the only bottleneck stage, all shared resources between stages A and B (e.g., resource f110), B and C (e.g., resource f011), and A, B and C (e.g., resources f110 and f111) may be allocated to stage B (e.g., f110_=f011_C=f111_A=f111_C=0). Further, if it is possible to add additional resources to the system, resources capable of serving the bottleneck stage(s) may be added, and as a result, the overall system capacity may be improved.

A variety of scheduling policies may be implemented during resource allocation, according to exemplary embodiments. For example, referring to FIG. 6, when processing stage B arrives at a job, resources capable of only serving processing stage B (e.g., dedicated resources) are first allocated to processing stage B. If none of these dedicated resources are available, resources capable of only serving two processing stages are next allocated to processing stage B. For example, resource f110 (e.g., resource f110_B) or resource f011 (e.g., resource f011_B) are next allocated. If these resources are unavailable, resources capable of serving all of processing stages A, B, and C are allocated to processing stage B. For example, resource f111 (e.g., resource f111_B) is next assigned to processing stage B. Such a scheduling policy may increase, or maximize the system throughput.

The flowcharts and block diagrams in the figures illustrate the architecture, functionality, and operation of possible implementations of systems, methods and computer program products according to various embodiments of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 7:
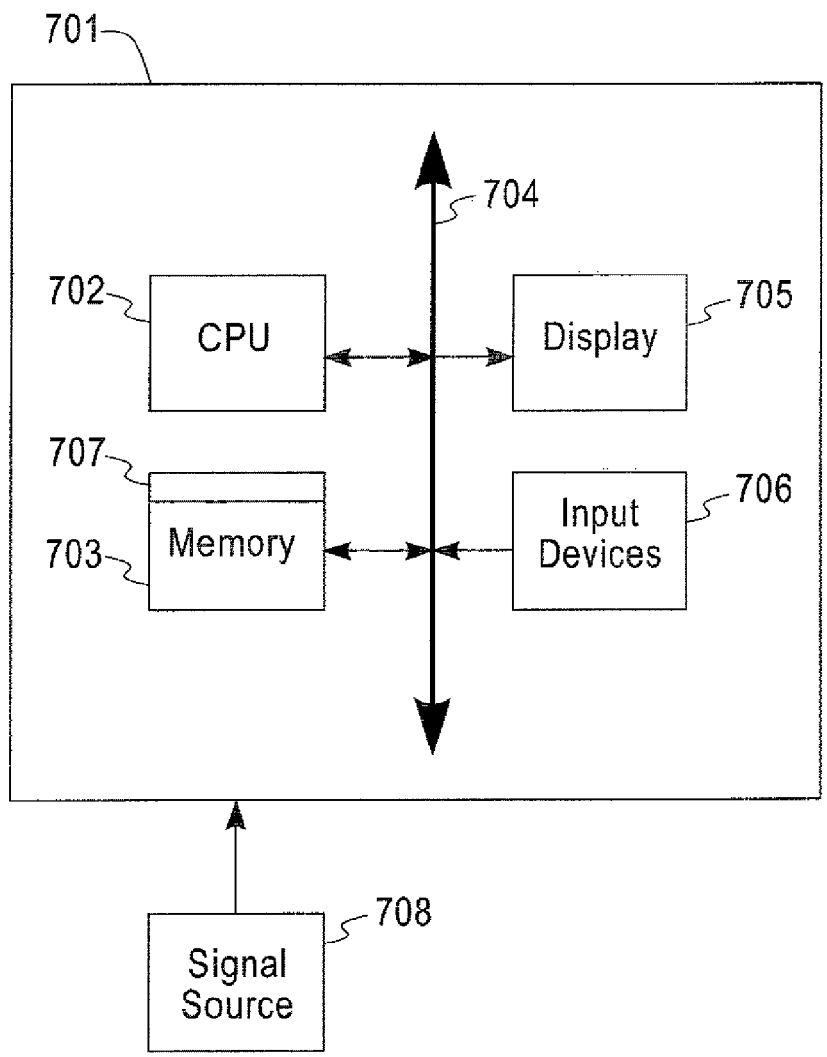
FIG. 7 is a computer system for identifying concurrency levels of processing stages in a distributed system, and utilizing the identified concurrency levels to identify common resources and bottlenecks in the system, and allocate resources in the system, according to an exemplary embodiment of the present disclosure.

More particularly, referring to FIG. 7, according to an exemplary embodiment of the present disclosure, a computer system 701 for identifying the concurrency levels of processing stages in a distributed system, and utilizing the identified concurrency levels to identify common resources and bottlenecks in the system, and allocate resources in the system, can comprise, inter alia, a central processing unit (CPU) 702, a memory 703 and an input/output (I/O) interface 704. The computer system 701 is generally coupled through the I/O interface 704 to a display 705 and various input devices 706 such as a mouse and keyboard. The support circuits can include circuits such as cache, power supplies, clock circuits, and a communications bus. The memory 703 can include random access memory (RAM), read only memory (ROM), disk drive, tape drive, etc., or a combination thereof. Embodiments of the present disclosure may be implemented as a routine 707 stored in memory 703 (e.g., a non-transitory computer-readable storage medium) and executed by the CPU 702 to process the signal from the signal source 708. As such, the computer system 701 is a general-purpose computer system that becomes a specific purpose computer system when executing the routine 707 of the present disclosure.

The computer platform 701 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device.

Having described exemplary embodiments for identifying the concurrency levels of processing stages in a distributed system, and utilizing the identified concurrency levels to identify common resources and bottlenecks in the system, and allocate resources in the system, it is noted that modifications and variations can be made by persons skilled in the art in light of the above teachings. It is therefore to be understood that changes may be made in exemplary embodiments of the disclosure, which are within the scope and spirit of the disclosure as defined by the appended claims. Having thus described exemplary embodiments of the disclosure with the details and particularity required by the patent laws, what is claimed and desired protected by Letters Patent is set forth in the appended claims.

What is claimed is:

1. A method of identifying a maximum concurrency level of a first processing stage of a plurality of processing stages in a distributed system, comprising:

receiving measurement data indicating a starting time and an ending time of the first processing stage for each of a plurality of job requests;

sorting, by a processor, the measurement data in an increasing arrival time order;

storing the sorted measurement data in a concurrency determination database;

initializing an observed concurrency level and the maximum concurrency level of the first processing stage to zero;

traversing the sorted measurement data beginning with a first portion of the measurement data having an earliest starting time;

increasing the observed concurrency level, by the processor, upon determining that a current portion of the measurement data indicates a starting time of the first processing stage for one or more of the job requests;

decreasing the observed concurrency level, by the processor, upon determining that the current portion of the measurement data indicates an ending time of the first processing stage for one or more of the job requests;

increasing the maximum concurrency level if the observed concurrency level was increased; and outputting the maximum concurrency level of the first processing stage for the plurality of job requests upon determining that the current portion of the measurement data indicates a last portion of the measurement data having the latest ending time, wherein the maximum concurrency level of a processing stage refers to a maximum number of job requests that the system can process at that stage at the same time.

2. The method of claim 1, wherein the measurement data comprises a plurality of timestamps, and each timestamp corresponds to an arrival time or a completion time of the first processing stage, or an arrival time or a completion time of another one of the plurality of processing stages.

3. The method of claim 1, further comprising:
generating a plurality of sorted orders of the plurality of job requests, wherein each of the plurality of sorted orders is based on an arrival time of a different processing stage from the plurality of processing stages; and
identifying a pattern based on the arrival time and a completion time of each of the plurality of processing stages in the plurality of sorted orders.

4. The method of claim 1, further comprising:
comparing the maximum concurrency level of the first processing stage to a maximum concurrency level of a second processing stage;
classifying a resource serving at least one of the first and second processing stages as a dedicated resource upon determining that the maximum concurrency level of the first processing stage is not equal to the maximum concurrency level of the second processing stage; and
classifying the resource as a shared resource upon determining that the maximum concurrency level of the first processing stage is equal to the maximum concurrency level of the second processing stage,
wherein the dedicated resource is capable of serving one of the first and second processing stages, and the shared resource is capable of serving both the first and second processing stages.

5. The method of claim 1, further comprising:
identifying a bottleneck stage corresponding to a processing stage from the plurality of processing stages;
identifying, from a plurality of resources, dedicated resources capable of serving one processing stage from the plurality of processing stages, and common resources capable of serving more than one processing stage from the plurality of processing stages; and
allocating common resources capable of serving the bottleneck stage to the bottleneck stage.

6. The method of claim 1, further comprising:
identifying, from a plurality of resources, dedicated resources capable of serving one processing stage from the plurality of processing stages, and common resources capable of serving more than one processing stage from the plurality of processing stages;

for each of the plurality of processing stages, allocating all common resources capable of serving each processing stage;
calculating a maximum throughput for each of the plurality of processing stages while all common resources are assigned to each respective processing stage;
identifying a bottleneck based on the maximum throughput calculated for each of the plurality of processing stages; and
allocating all common resources to the bottleneck stage.

7. The method of claim 1, further comprising:
determining a maximum concurrency level of each of the plurality of processing stages;
identifying a system bottleneck, wherein the system bottleneck corresponds to a processing stage from the plurality of processing stages having a lowest maximum concurrency level.

8. The method of claim 1, further comprising:
determining a maximum concurrency level of each of the plurality of processing stages; and
identifying a system bottleneck, wherein the system bottleneck corresponds to a processing stage from the plurality of processing stages having a lowest maximum concurrency level.

9. The method of claim 1, further comprising:
determining a maximum concurrency level of each of the plurality of processing stages;
determining a time-weighted average concurrency level of each of the plurality of processing stages; and
identifying a system bottleneck, wherein the system bottleneck corresponds to a processing stage from the plurality of processing stages having a smallest difference between its corresponding maximum concurrency level and its corresponding time-weighted average concurrency level.

10. The method of claim 1, further comprising:
identifying, from a plurality of resources, dedicated resources capable of serving one processing stage from the plurality of processing stages, and common resources capable of serving more than one processing stage from the plurality of processing stages;
allocating the dedicated resources to the plurality of processing stages as the processing stages arrive; and
allocating the common resources to the plurality of processing stages as the processing stages arrive, upon determining that the dedicated resources are unavailable,
wherein the common resources are allocated in an order of common resources capable of serving a fewest number of processing stages to common resources capable of serving a largest number of processing stages.

11. The method of claim 1, further comprising:
determining a maximum concurrency level of each of the plurality of processing stages;
identifying consecutive processing stages from the plurality of processing stages; and
combining the consecutive processing stages into a single processing stage upon determining that the maximum concurrency level of each of the respective consecutive processing stages are equal to each other.

12. A non-transitory computer readable storage medium embodying instructions executed by a processor for performing a method of identifying a maximum concurrency level of a first processing stage of a plurality of processing stages in a distributed system, the method comprising:

receiving measurement data indicating a starting time and an ending time of the first processing stage for each of a plurality of job requests;

sorting the measurement data in an increasing arrival time order;

storing the sorted measurement data in a concurrency determination database;

initializing an observed concurrency level and the maximum concurrency level of the first processing stage to zero;

traversing the sorted measurement data beginning with a first portion of the measurement data having an earliest starting time;

increasing the observed concurrency level upon determining that a current portion of the measurement data indicates a starting time of the first processing stage for one or more of the job requests;

decreasing the observed concurrency level upon determining that the current portion of the measurement data indicates an ending time of the first processing stage for one or more of the job requests;

increasing the maximum concurrency level if the observed concurrency level was increased; and outputting the maximum concurrency level of the first processing stage for the plurality of job requests upon determining that the current portion of the measurement data indicates a last portion of the measurement data having the latest ending time, wherein the maximum concurrency level of a processing stage refers to a maximum number of job requests that the system can process at that stage at the same time.

13. The non-transitory computer readable storage medium of claim 12, wherein the measurement data comprises a plurality of timestamps, and each timestamp corresponds to an arrival time or a completion time of the first processing stage, or an arrival time or a completion time of another one of the plurality of processing stages.

14. The non-transitory computer readable storage medium of claim 12, further comprising:

generating a plurality of sorted orders of the plurality of job requests, wherein each of the plurality of sorted orders is based on an arrival time of a different processing stage from the plurality of processing stages; and identifying a pattern based on the arrival time and a completion time of each of the plurality of processing stages in the plurality of sorted orders.

15. The non-transitory computer readable storage medium of claim 12, further comprising:

comparing the maximum concurrency level of the first processing stage to a maximum concurrency level of a second processing stage;

classifying a resource serving at least one of the first and second processing stages as a dedicated resource upon determining that the maximum concurrency level of the first processing stage is not equal to the maximum concurrency level of the second processing stage; and classifying the resource as a shared resource upon determining that the maximum concurrency level of the first processing stage is equal to the maximum concurrency level of the second processing stage, wherein the dedicated resource is capable of serving one of the first and second processing stages, and the shared resource is capable of serving both the first and second processing stages.

16. The non-transitory computer readable storage medium of claim 12, further comprising:

identifying a bottleneck stage corresponding to a processing stage from the plurality of processing stages;

identifying, from a plurality of resources, dedicated resources capable of serving one processing stage from the plurality of processing stages, and common resources capable of serving more than one processing stage from the plurality of processing stages; and allocating common resources capable of serving the bottleneck stage to the bottleneck stage.

17. The non-transitory computer readable storage medium of claim 12, further comprising:

identifying, from a plurality of resources, dedicated resources capable of serving one processing stage from the plurality of processing stages, and common resources capable of serving more than one processing stage from the plurality of processing stages;

for each of the plurality of processing stages, allocating all common resources capable of serving each processing stage;

calculating a maximum throughput for each of the plurality of processing stages while all common resources are assigned to each respective processing stage; and identifying a bottleneck based on the maximum throughput calculated for each of the plurality of processing stages; and allocating all common resources to the bottleneck stage.

18. The non-transitory computer readable storage medium of claim 12, further comprising:

determining a maximum concurrency level of each of the plurality of processing stages;

identifying a system bottleneck, wherein the system bottleneck corresponds to a processing stage from the plurality of processing stages having a lowest maximum concurrency level.

19. The non-transitory computer readable storage medium of claim 12, further comprising:

determining a maximum concurrency level of each of the plurality of processing stages; and identifying a system bottleneck, wherein the system bottleneck corresponds to a processing stage from the plurality of processing stages having a lowest maximum concurrency level.

20. The non-transitory computer readable storage medium of claim 12, further comprising:

determining a maximum concurrency level of each of the plurality of processing stages;

determining a time-weighted average concurrency level of each of the plurality of processing stages; and identifying a system bottleneck, wherein the system bottleneck corresponds to a processing stage from the plurality of processing stages having a smallest difference between its corresponding maximum concurrency level and its corresponding time-weighted average concurrency level.

21. The non-transitory computer readable storage medium of claim 12, further comprising:

identifying, from a plurality of resources, dedicated resources capable of serving one processing stage from the plurality of processing stages, and common resources capable of serving more than one processing stage from the plurality of processing stages;

allocating the dedicated resources to the plurality of processing stages as the processing stages arrive; and allocating the common resources to the plurality of processing stages as the processing stages arrive, upon determining that the dedicated resources are unavailable, wherein the common resources are allocated in an order of common resources capable of serving a fewest number of processing stages to common resources capable of serving a largest number of processing stages.

22. The non-transitory computer readable storage medium of claim 12, further comprising:
  determining a maximum concurrency level of each of the plurality of processing stages;
  identifying consecutive processing stages from the plurality of processing stages; and
  combining the consecutive processing stages into a single processing stage upon determining that the maximum concurrency level of each of the respective consecutive processing stages are equal to each other.

* * * * *